Figure 1:
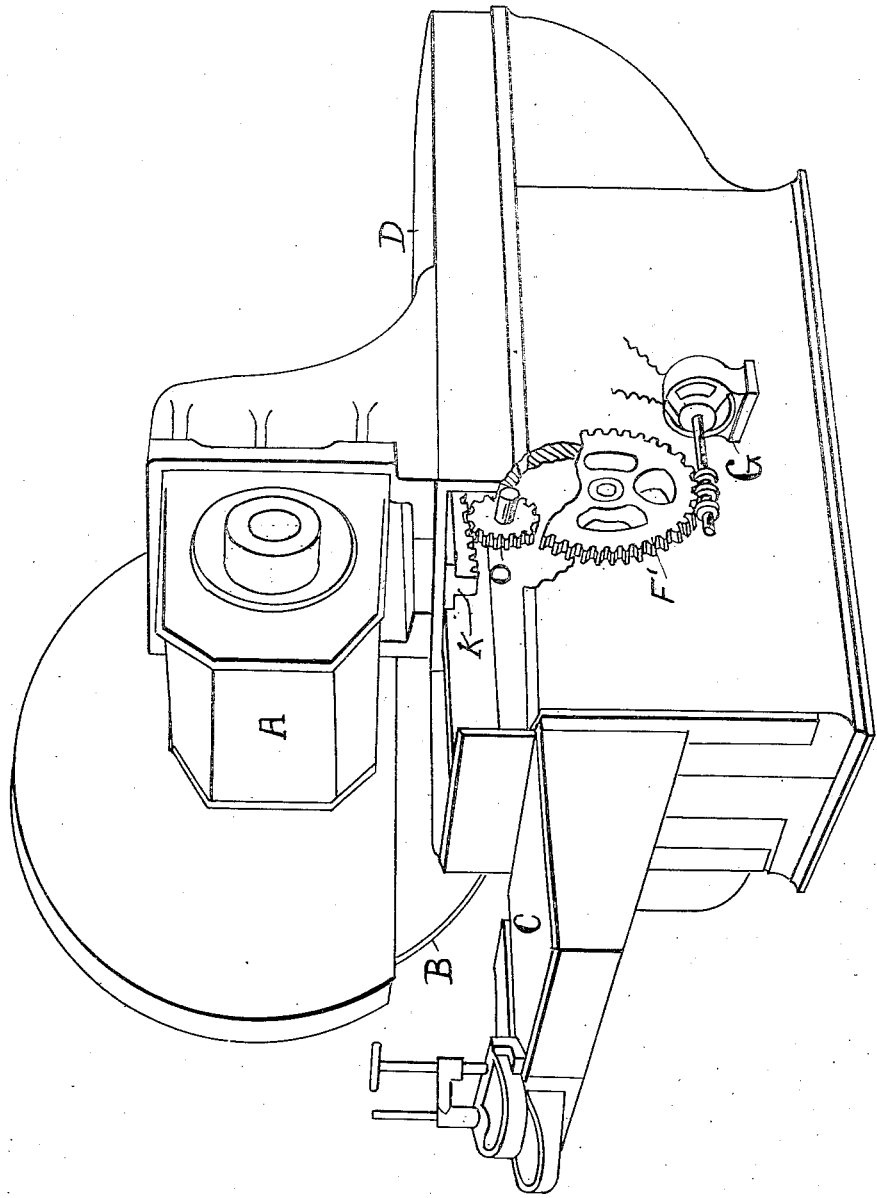

L. H. THULLEN.
CONTROL SYSTEM FOR ELECTRIC MOTORS.
APPLICATION FILED DEC. 11, 1912.

1,070,638.

Patented Aug. 19, 1913.

WITNESSES

INVENTOR

L. H. THULLEN.
CONTROL SYSTEM FOR ELECTRIC MOTORS.
APPLICATION FILED DEC. 11, 1912.
1,070,638.
Patented Aug. 19, 1913.
2 SHEETS—SHEET 2.
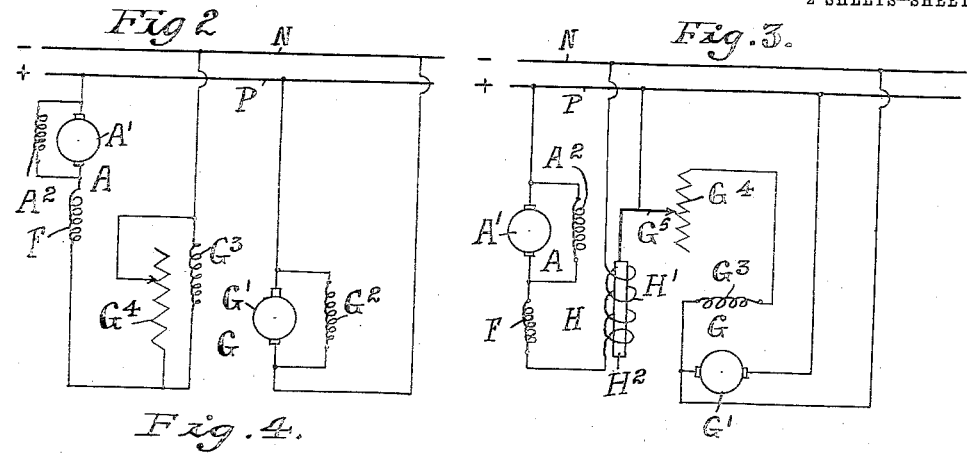
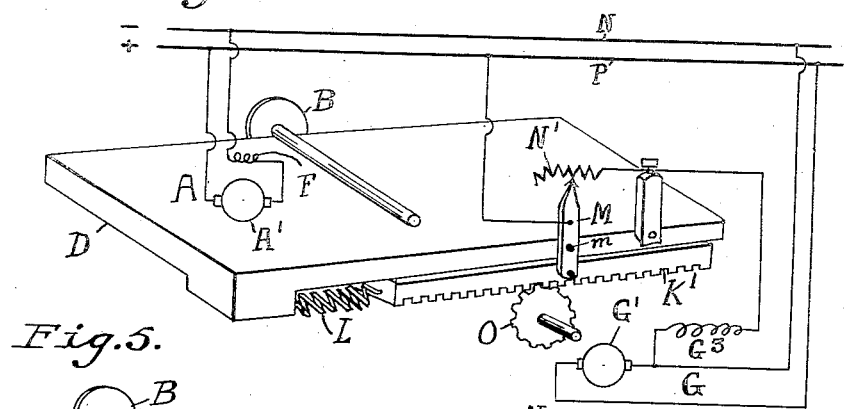
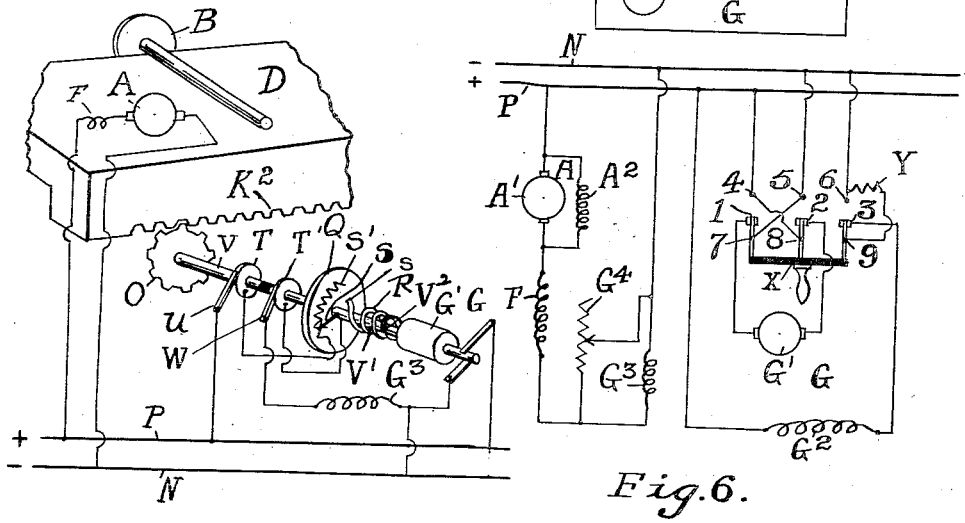
WITNESSES
INVENTOR
L. H. Thullen
by F. N. Barber
attorney

UNITED STATES PATENT OFFICE.

LOUIS H. THULLEN, OF CINCINNATI, OHIO.

CONTROL SYSTEM FOR ELECTRIC MOTORS.

1,070,638.  Specification of Letters Patent.  Patented Aug. 19, 1913.

Application filed December 11, 1912. Serial No. 736,062.

*To all whom it may concern:*

Be it known that I, LOUIS H. THULLEN, a citizen of the United States, residing at Cincinnati, in the county of Hamilton and State of Ohio, have invented new and useful Improvements in Control Systems for Electric Motors, of which the following is a specification.

My invention relates to systems for automatically controlling electric motors, and has particular reference to the control of electrically-driven feed-carriages for friction or other saws, but I do not limit my invention thereto.

It is necessary in sawing material having a large section to feed the saw to the material, or the material to the saw, at a slower speed than is necessary where the section of the material is small. If it is attempted to saw through a large piece of metal or equivalent material with the feed carriage moving at a high speed, the current taken by the motor which rotates the saw will be increased owing to the reduction in the back E. M. F. caused by the reduced speed of the motor armature. It is the principal object of my invention to automatically control the speed of the motor which feeds the saw or the material, in accordance with the load on the motor which rotates the saw. If, in my invention, the load on the saw-rotating motor is increased, the speed of the feed-carriage motor is automatically decreased to correspond with the increased load on the other motor; and if the load on the saw-rotating motor is decreased, the speed of the feed-carriage motor is automatically and correspondingly increased.

Referring to the accompanying drawings, Figure 1 is a perspective view of a sawing machine embodying my invention, parts of the machine being broken away. Figs. 2, 3, 4, and 5 are diagrammatic views showing four of the many forms which my invention may assume. Fig. 6 is a diagrammatic view showing an arrangement for obtaining a quick return of the carriage.

On Fig. 1, A represents an electric motor for rotating the saw B. The motor is mounted on the carriage D, which reciprocates parallel with the saw on the bed C. The carriage D is provided with the rack K on its under side. The motor G on the side of the bed C drives the gear-wheel F', which indirectly drives the pinion O, meshing with the rack K. The work or material to be cut is laid on the table C. The carriage D is moved to the left by the motor G to feed the saw to the work on the table.

On Fig. 2, which shows diagrammatically the two motors just mentioned and the wiring therefor, P and N show the positive and negative supply mains for the motors. The motor A has its armature A' and its series field F connected across the mains P and N and in series with the field winding $G^3$ of the motor G. $A^2$ is the shunt field winding for the motor A. Although I have shown the motor A as a compound-wound motor, the field may be wound differently in well known ways.

The armature G' of the motor G is connected across the mains P and N. $G^2$ is the shunt field winding for the motor G. It is advisable to have the shunt winding $G^2$ a small per cent. of the total field and just sufficient to prevent the motor G from running away. The winding $G^3$ should preferably have a large per cent. of the total field to give a very wide range in speed. I have placed the field winding $G^3$ in series with the armature A' of the motor, so that the current through the armature A' may control the field winding $G^3$. When the armature A' slows down due to the saw cutting through a thick or heavy section, the current taken by the armature A' increases causing the current through the field winding $G^3$ to increase with the result that the speed of the armature G', and, therefore, of the carriage D, is decreased. If the work done by the saw that is, if the load on the motor A, is reduced, as by cutting a material of smaller section, the armature A' will rotate faster, thereby developing an increased back E. M. F. which cuts down the current through the armature, and, therefore, through the field winding $G^3$ of the motor, with the result that the armature G' will rotate faster and cause the saw carriage D to be fed faster to the work on the table C.

I have shown an adjustable resistance $G^4$ in shunt with the winding $G^3$. This resistance may be adjusted manually or automatically. By means of this resistance the strength of the field winding $G^3$ can be adjusted to suit the conditions.

In Fig. 3, I have placed the motor A across the mains and in series with the winding H' of the solenoid H. The armature G' and the field winding $G^3$ of the motor G are arranged in parallel with each other across the mains, the adjustable resistance $G^4$ being in series with the winding $G^3$. The movable element or contact finger $G^5$ of the resistance or field regulator $G^4$ is connected to the plunger $H^2$ of the solenoid H, the arrangement being such that, when the current in the winding H' increases, the plunger $H^2$ moves the finger $G^5$ so as to cut out or remove some of the resistance $G^4$ from the circuit through the field winding $G^3$. When the current through the armature A' is strengthened for any reason, as by the load on the motor A being increased, the winding H' becomes more highly excited and causes the plunger $H^2$ to rise and cut out a portion of the resistance $G^4$ from the field winding $G^3$, thereby causing an increase of current in the field winding $G^3$, and a corresponding decrease in the speed of the armature G', and, consequently, of the saw-feeding carriage D. When the current through armature A' decreases for any reason, the plunger H' falls correspondingly and inserts more of the resistance $G^4$ into the circuit of the field winding $G^3$, thereby causing the speed of the motor G to increase and feed the carriage D at a greater speed. I do not desire to be limited to the use of a solenoid for varying the resistance or regulator $G^4$, as various other means may be employed.

In Fig. 4, the carriage D for the saw B is provided with the rack K' which is free to move backward and forward against the resistance of the spring L shown between the forward end of the rack and an abutment on the carriage. Attached pivotally at $m$ to the carriage D is the movable element or contact finger M whose upper end may sweep over contacts on the resistance N' connected in any desired manner so as to travel with the carriage. The lower end of the finger M below the pivot $m$ is pivotally connected to the rack K'. The pinion O, driven by the motor G meshes with the rack K'. The armature is shown connected across the mains P and N, and the shunt field winding $G^3$ is shown in series with the regulator or adjustable resistance N', the finger M being connected to the main P. The rotation of the armature G' causes the pinion O to push the carriage D to the left by power transmitted through the spring L. For a certain load or resistance encountered by the saw B, the rack will take a certain position relative to the carriage and cause the finger M to take a definite place with respect to the resistance N'. If the saw encounters a greater resistance, which puts a greater load on the saw and, therefore, on the saw-rotating motor A, the motor G pushes the rack to the left against the resistance of the spring L and causes the finger M to remove a portion of the resistance N' from the circuit of the field winding $G^3$, thereby increasing the current through this winding and causing the speed of the armature G' to decrease. If the saw encounters a smaller resistance, or if the resistance thereto decreases, the rack K' will move backwardly with reference to the carriage, causing the finger M to insert more of the resistance N' in series with the field winding $G^3$, and the speed of the armature G' to increase.

In Fig. 5, the rack $K^2$ is fixed with respect to the carriage D. The shaft V for driving the pinion O has rigidly connected thereto the disk Q and the two collecting rings T and T' on which bear the brushes U and W, respectively, connected to the mains P and N. The face of the disk Q nearest the motor G is provided with the resistance S' arranged concentric with the disk and has one end connected to the ring T. The shaft V' of the motor G is arranged in line with the shaft V, but is not directly connected thereto. The shaft V' has thereon the coil spring R having one end attached to the shaft V' at $V^2$ and the other end to the face of the disk, as at $s$. The shaft V' carries the movable element or contact finger S which coöperates with the resistance S' to control the amount of the same in series with the field winding $G^3$.

By the construction shown on Fig. 5 the angular positions of the shafts V and V' are varied as the torque is increased or decreased by the motor G. When the resistance to the saw B is increased, the spring R is put in greater tension and the finger S travels along the resistance so as to decrease the resistance in the circuit of the field winding $G^3$, whereby the current through this winding is increased and the speed of the armature G' decreased. When the resistance to the saw is lessened, the tension of the spring R is reduced and the finger rotates backward with respect to the disk O and inserts more of the resistance S' in the circuit of the winding $G^3$ and causes the speed of the motor G to increase.

In Figs. 2, 3, 4, and 5, I have shown different ways of increasing or decreasing the speed of the carriage-feeding motor as the pressure on the saw, or the load on the saw-rotating motor decreases or increases, or different ways by which the speed of the motor G is varied in order to obtain substantially constant pressure of the carriage and, consequently, of the saw.

Fig. 6 shows a modification whereby a quick reversing movement of the carriage D may be obtained. I provide a triple-pole double-throw reversing switch X, which may connect the center terminals 1, 2, 3 to the upper terminals 4, 5, 6, respectively, or to the lower terminals 7, 8, 9, respectively. When the switch X closes the circuits with the upper contacts 4, 5, 6, the armature circuit is from the positive line P through the terminals 4 and 1, the armature G' from left to right, and the terminals 2, 5, to the negative line N. The circuit for the shunt field winding G² passes from the positive line P through the said winding and the terminals 3 and 6 to the negative line. With the current flowing through the armature as just described the motor G is operated to feed the carriage D in the direction for sawing material on the table C (Fig. 1).

When the sawing operation is completed, or whenever it is desired to move the carriage backwardly, the switch X is thrown to the lower position so as to engage the terminals 7, 8, 9. The armature circuit is from the positive line P through the terminals 4, 8, 2, the armature G' from right to left, and the terminals 1, 7, 5 to the negative line N. The circuit for the field winding G² is from the positive line through the field winding G², the terminals 3, 9, and the extra resistance Y to the negative line N. These circuits cause the armature to reverse since the current through the armature has been reversed while the direction of current through the field windings remains unchanged. Not only is the direction of the armature reversed but its speed of reverse rotation is greater than possible in the other direction owing to the inclusion of the resistance Y in the circuit of the field windings. This method of reversing the motor can obviously be applied to Figs. 2, 3, 4, and 5. Other methods of reversing the motor G can also be devised.

I claim—

1. In a system for controlling electric motors, an electric motor, a device driven by the motor against load of varying value, and means for maintaining the resistance to the said device at a substantially constant value, the said means including means for varying the speed of the motor inversely as the value of the resistance varies.

2. In a system for controlling electric motors, an electric motor, a device driven by the motor against resistance load of varying value, and means for maintaining the resistance to the said device at a substantially constant value, the said means including means for varying the speed of the motor.

3. In a system for controlling electric motors, an electric motor, a carriage driven thereby, a second electric motor, means whereby the speed of travel of the carriage varies the load on the second motor, and means varying the speed of the carriage so as to maintain the load on the second motor at a substantially constant value.

4. In a system for controlling electric motors, an electric motor, a saw driven thereby, a carriage to bring the saw and the material to be sawed into coöperative relation, an electric motor to drive the carriage, and means for varying the speed of the second motor inversely as the load on the first motor varies.

5. In a system for controlling electric motors, an electric motor, a saw driven thereby, a carriage to bring the saw and the material to be sawed into coöperative relation, an electric motor to drive the carriage, and means for varying the speed of the second motor inversely as the load on the first motor varies.

6. In a system for controlling electric motors, a rotary saw, means for rotating the same, a carriage to bring the saw and the material to be sawed into coöperative relation, an electric motor for driving the carriage, and means for varying the speed of the motor inversely as the work encountered by the saw varies.

7. In a system for controlling electric motors, a rotary saw, means for rotating the same, a carriage to bring the saw and the material to be sawed into coöperative relation, an electric motor for driving the carriage, and means for maintaining the pressure between the saw and the material at a substantially constant value.

8. In a system for controlling electric motors, an electric motor, a carriage driven thereby, a second electric motor, means whereby the rate of travel of the carriage varies the load on the second motor, and means whereby variation in the load on the second motor operates to cause the first motor to drive the carriage at a speed to reduce said load when above a predetermined value and to increase the said load when below said value.

9. In a system for controlling electric motors, a carriage having travel through varying resistance, an electric motor for driving the carriage, a second electric motor, the field windings of the carriage-driving motor being in series with the armature of the second motor, and means for varying the speed of the carriage driving motor when the load on the second motor changes.

10. In a system for controlling electric motors, an electric motor, means for varying the load thereon, a second electric motor, and means for automatically weakening the field of the second motor when the load on the first motor is decreased and for automatically strengthening the said field when the load on the first motor is increased.

11. In a system for controlling electric motors, an electric motor, a resistance, a second electric motor having a field winding controlled by the said resistance, and means controlled by the first motor for controlling the said resistance.

12. In a system for controlling electric motors, an electric motor, a resistance, a second electric motor having a field winding in series with the resistance, and means controlled by the first motor for controlling the said resistance.

13. In a system for controlling electric motors, an electric motor, a second electric motor, a field winding therefor, a resistance for the winding, and means controlled by the first motor for varying the amount of the resistance limiting the current through the field winding of the second motor.

14. In a system for controlling electric motors, an electric motor, a solenoid energized thereby, a second electric motor, a field winding therefor, a resistance to control the latter, and means controlled by the solenoid for varying the amount of the resistance affecting the field inversely as the load on the first motor varies.

15. In a system for controlling electric motors, a carriage having travel through varying resistance, an electric motor for driving the carriage, a yielding driving connection between the motor and the carriage, the said connection having travel one way or the other relatively to the carriage according as the resistance exceeds or falls below a predetermined value, and means controlled by the movement of the said connection for varying the speed of the motor inversely as the resistance varies.

16. In a system for controlling electric motors, a carriage having travel through varying resistance, an electric motor for driving the carriage, a yielding driving connection between the motor and the carriage, the said connection having travel one way or the other relatively to the carriage according as the resistance exceeds or falls below a predetermined value, and means controlled by the movement of the said connection for varying the speed of the motor so as to maintain the said resistance at a substantially constant value.

17. In a system for controlling electric motors, an electric motor subject to varying loads, a yielding two-part driving connection, a torsion spring having its ends connected respectively to the said parts, a resistance for the motor carried by one part, and a contact finger carried by the other part, whereby the varying loads on the motor cause variations in the amount of the resistance controlling the motor.

18. In a system for controlling electric motors, an electric motor, a device driven by the motor against resistance of varying value, means for varying the speed of the motor inversely as the value of the resistance varies, and means for causing the motor to have a reverse speed which is faster than any possible forward speed.

Signed at Cincinnati, Ohio, this seventh day of December, 1912.

LOUIS H. THULLEN.

Witnesses:
F. W. WILLEY,
EMMA BLEICH.